Figure 1A:
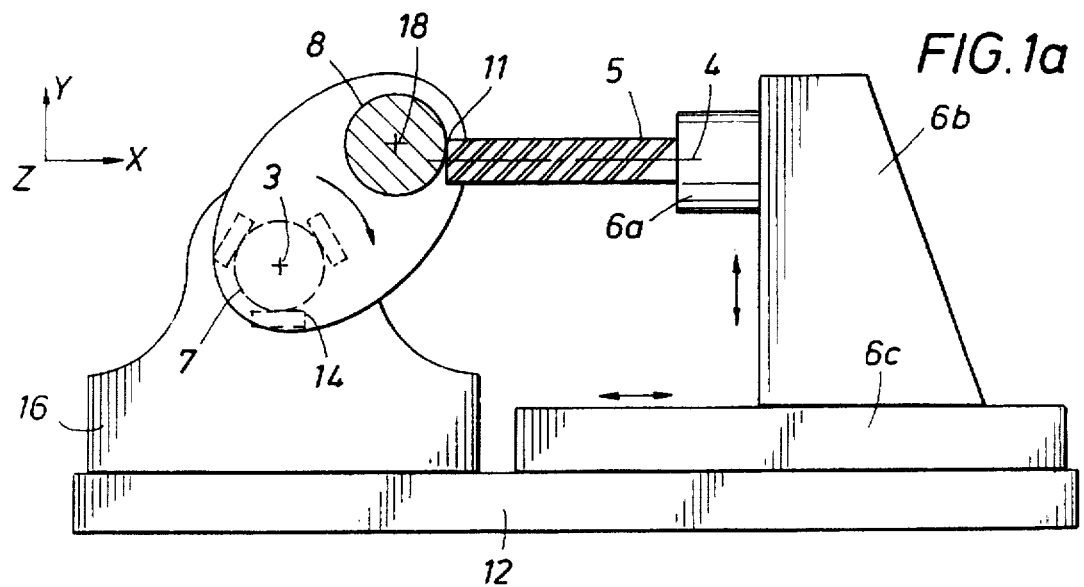

United States Patent [19]

Schrod et al.

[11] Patent Number: 5,765,270
[45] Date of Patent: Jun. 16, 1998

[54] METHOD AND APPARATUS FOR MACHINING WORKPIECES WITH ECCENTRIC, SUBSTANTIALLY ROTATIONALLY SYMMETRICAL, WORKPIECE SURFACES

[75] Inventors: Hans Schrod, Goppingen-Faurndau; Wolf-Dietrich Voss, Boll; Rolf Santorius, Uhingen-Nassachmuhle; Paul Dieter Schapf, Schlat; Anton Horsky, Wangen; Matthias Kohlhase, Schramberg-Sulgen, all of Germany

[73] Assignee: Boehringer Werkzeugmaschinen GmbH, Germany

[21] Appl. No.: 577,711

[22] Filed: Dec. 22, 1995

[30] Foreign Application Priority Data

Dec. 23, 1994 [DE] Germany .................. 44 46 475.4

[51] Int. Cl.$^6$ ............................................ B23B 7/00
[52] U.S. Cl. ............... 29/27 R; 29/6.01; 29/888.08; 82/106; 409/166; 409/199; 409/201; 409/244
[58] Field of Search ............... 82/106; 29/6.01, 29/888.08, 27 R; 406/166, 199, 200, 201, 244

[56] References Cited

U.S. PATENT DOCUMENTS

| | | | |
|---|---|---|---|
| 1,137,917 | 5/1915 | Sink et al. | 409/166 |
| 2,126,462 | 8/1938 | Groene | 82/3 |
| 2,650,522 | 9/1953 | Godfriaux | 29/6.01 |
| 4,269,551 | 5/1981 | Kralowetz | 409/132 |
| 4,571,796 | 2/1986 | Sellner et al. | 29/27 R |
| 4,614,467 | 9/1986 | Takagi et al. | 29/888.08 |
| 4,635,340 | 1/1987 | Link | 409/166 |
| 4,790,698 | 12/1988 | Heffron | 409/200 |
| 4,801,226 | 1/1989 | Gleason | 82/106 |
| 5,025,689 | 6/1991 | Mayer | 82/106 |
| 5,030,049 | 7/1991 | Voss | 409/199 |
| 5,052,089 | 10/1991 | Gadaud et al. | 29/27 R |
| 5,078,556 | 1/1992 | Schrod et al. | 409/132 |
| 5,159,741 | 11/1992 | Garschagen et al. | 29/27 R |
| 5,313,694 | 5/1994 | Yonemoto et al. | 29/27 R |

FOREIGN PATENT DOCUMENTS

| | | | |
|---|---|---|---|
| 286067 | 6/1968 | Austria | 3/6 |
| 1236303 | 3/1967 | Germany . | |
| 0417446 | 3/1991 | Germany | 5/13 |
| 3930489 | 11/1993 | Germany . | |
| 4418823 | 7/1995 | Germany | 3/4 |
| 19502476 | 8/1995 | Germany | 3/10 |
| 56-3102 | 1/1981 | Japan | 82/106 |
| 03643 | of 1912 | United Kingdom . | |

OTHER PUBLICATIONS

Prospekt der Fa. Heyligenstaedt, Ausgabedatum Aug. 1992 Nr.:682 d 10000892(I)—Veroffentlichung im Jun. 1991 zur EMO–Paris.

Prospekt der Fa. Heyligenstaedt, Ausgabedatum Dec. 1992 Nr.:682 d 15001292 (II).

Zeitschrift "Maschine und Werkzeug" DE–Fertigungstechnik, Jan. 1993, Seiten 30 bis 35– bzw. Sonderdruck aus Maschine und Werkzung Produktionsfaktor Zeit.

*Primary Examiner*—A. L. Pitts
*Assistant Examiner*—Christopher Kirkman
*Attorney, Agent, or Firm*—Vaden, Eickenroht & Thompson, L.L.P.

[57] ABSTRACT

The invention discloses a method of machining workpieces such as crankshafts, camshafts or similarly shaped members, having surfaces which are disposed both concentrically and also eccentrically relative to a workpiece axis and which are rotationally symmetrical or approximately rotationally symmetrical. The machining of the concentrically curved surfaces is effected by means of turning, rotational broaching and/or turning-rotational broaching and the machining of the eccentric workpiece surfaces is effected by means of end-milling wherein the axis of rotation of the milling cutter is transverse with respect to the spindle axis 3, and the workpiece is subjected to cutting finishing machining and the clamping means.

29 Claims, 4 Drawing Sheets

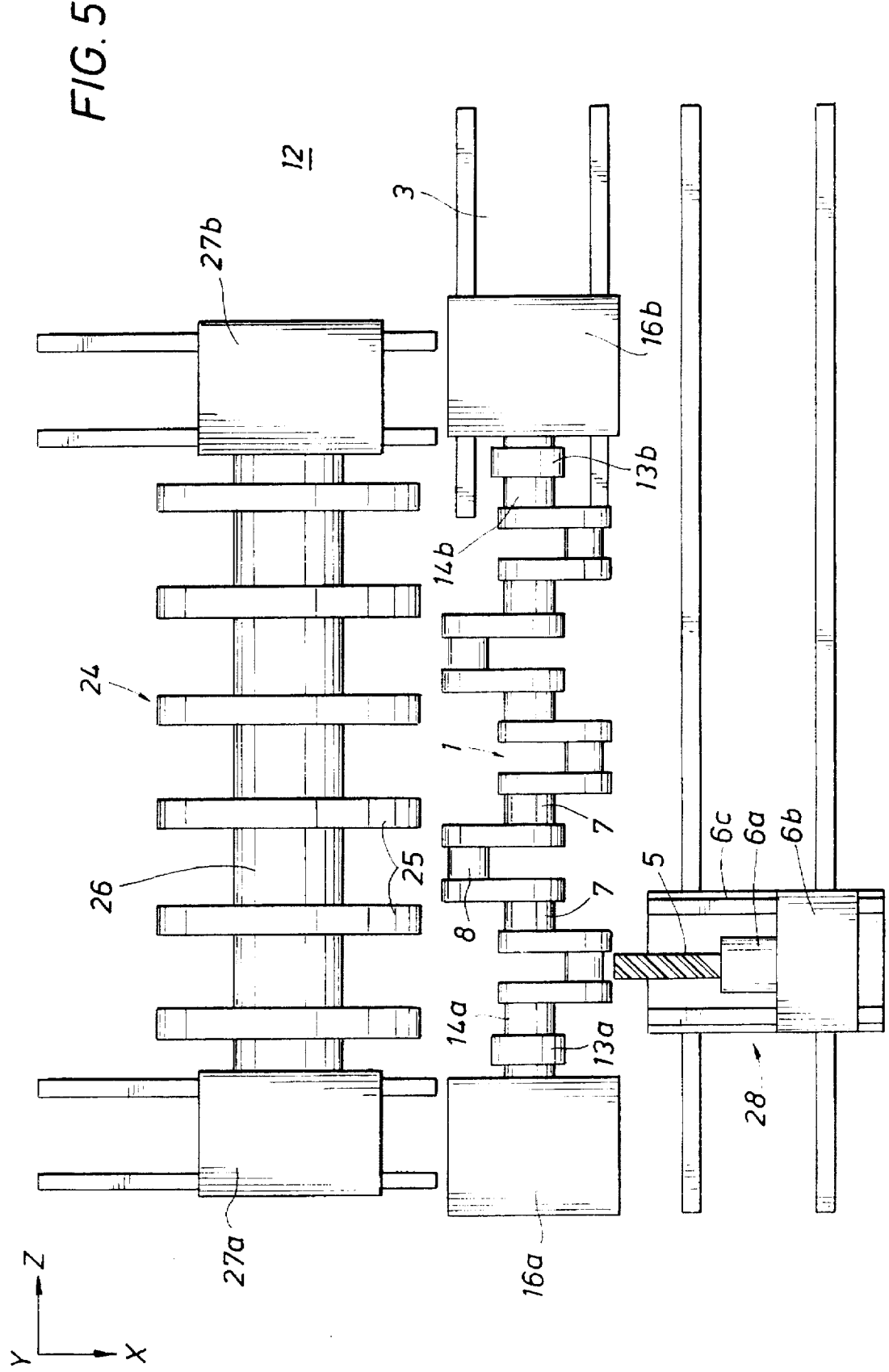

METHOD AND APPARATUS FOR MACHINING WORKPIECES WITH ECCENTRIC, SUBSTANTIALLY ROTATIONALLY SYMMETRICAL, WORKPIECE SURFACES

The invention concerns a method of machining workpieces such as crankshafts, camshafts or similarly shaped members,having surfaces which are disposed both concentrically and also eccentrically relative to a workpiece axis and which are rotationally symmetrical or approximately rotationally symmetrical.

As a crankshaft is a very typical workpiece of that kind, that workpiece is generally used by way of example in the description hereinafter, without the intention of use of the invention being restricted thereto. In particular the invention can also be equally used for surfaces which are not rotationally symmetrical, such as for example the cans of a camshaft.

In regard to crankshaft machining, a distinction is to be drawn between machining the concentrically disposed main bearing locations and machining the eccentrically disposed crank throw bearing locations.

Besides conventional turning and so-called spinning cutting (milling with internally toothed annular milling cutters which embrace the crankshaft), known machining methods for the production of cranshafts include in particular rotational broaching (a curved broaching tool pivots in parallel relationship beside the rotating crankshaft) and turning-rotational broaching (the pivotable rotational broaching tool is used, without simultaneous pivotal movement, in a pure plunge-cutting procedure, like a turning tool, for certain working steps, alternately with rotational broaching machining).

In that respect crank throw bearing journals as well as the main bearing journals can be machined if for that pose the crankshaft is eccentrically clamped in position, that is to say in such a way that the spindle axis of the driving tool spindles (in general the crankshaft is carried at both ends in a tail stock and a clamping chuck respectively) coincides with the axis of the rotationally symmetrical surface to be machined, that is to say the middle of the crank throw bearing journal. The main bearing journal, that is to say the middle of the crankshaft, rotates in that case eccentrically about the spindle axis.

The disadvantage of that procedure is that on the one hand it is necessary to change over the clamping condition of the crankshaft from concentric clamping to eccentric clamping for the operation of finishing machining of the crankshaft, and on the other hand the chucks used for eccentric clamping are on the one hand very expensive with prices in the six-figure range of German Marks, and on the other hand can generally be used only for a given crankshaft shape size.

It is also already known from Austrian patent specification No. 286 067 for the eccentric workpiece surfaces of a workpiece such as for example a crankshaft to be machined by means of the end face of an end-milling cutter whose axis of rotation is arranged transversely to the longitudinal axis of the workpiece, that is to say the spindle axis, and in addition the crankshaft side cheek portions can be machined in that case by the peripheral surfaces of the milling cutter.

However that solution does not disclose any possible way of carrying out a finishing cutting machining operation on a workpiece in one clamping arrangement and there is no indication of any way in which deformation of the workpiece due to the forces occurring in the cutting machining operation can be minimised. Furthermore in the known solution, the movement of the milling cutter is restricted to linear movement in the X- and Y-directions.

Therefore the object of the present invention is to provide a method and an apparatus for machining crankshaft and similar members, which permits fast, inexpensive and dimensionally accurate production and which in particular requires short setting times when changing over to a new product and which is thus suitable in particular for short-series production.

By virtue of the step of machining the eccentrically disposed, curved or even rotationally symmetrical workpiece surfaces such as for example the crank throw bearing journal by means of an end-milling cutter whose axis of rotation is disposed transversely to the spindle axis of the crankshaft, machining of the crankshaft which is clamped an the main bearing axis is also possible at the crank throw bearings, and thus the crankshaft can also be machined and in particular can be subjected to finishing machining in one clamping arrangement.

For that purpose the end-milling cutter which machines the rotationally symmetrical surface with its end cutting edges and which possibly simultaneously or separately machines the adjoining crankshaft side cheek portion surfaces with the cutting edges on the milling cutter peripheral surface must be movable at least in the X-direction and in addition must also be movable in a second direction, namely either in the Y-direction, or it must be pivotable about an axis parallel to the C-axis, namely about the C2-axis, and more specifically to such a degree that the longitudinal a of the milling cutter can be oriented into a position approximately perpendicularly to the location to be machined.

As machining by means of such a finger milling cutter alone, just by virtue of the stability of such a finger milling cutter, cannot be as efficient as other machining methods, in particular rotational broaching and turning-rotational broaching, a preferred configuration provides that a crankshaft is subjected to finishing cutting machining in a clamping arrangement by a procedure whereby the main bearing locations which are then disposed concentrically are machined with conventional efficient methods such as rotational broaching or turning-rotational broaching or turning, while the eccentrically disposed crank throw bearing locations are machined by means of the above-described rotational milling operation.

An advantage of this procedure is that, by virtue of the appropriate control of the individual movement of the milling cutter, that is to say the linear movements in the X- and Y directions or the linear moment in the X-direction in combination with the pivotal movement about the C2-axis or also other possible movement which however must as a result include motion components both in the x- and in the Y direction and which obviously must be controlled in dependence on the rotational position of the crankshaft and therefore the position of the C-axis, it is possible, exclusively by modified displacement travel distances and therewith modified programing, but with the sane machine and tool design configuration, already to produce a large number of different products, that is to say crankshafts with different throws, a different number of crank pins etc. This is highly desirable in particular for the production of individual item or short series of such products.

A further advantage is that this kind of crank throw bearing machining is very gentle in terms of the workpiece. The forces and in particular the radial forces which are applied to the crankshaft with other machining methods when machining the eccentrically clamped crank throw bearings frequently result in stresses within the workpiece, which are only released after the workpiece is released from its clamped condition and which then cause deformation and dimensional inaccuracy of the crankshaft.

With the method according to the invention it is possible in particular to minimise the application of radial forces by virtue of the fact that the and-milling cutter which is generally in the form of a finger milling cutter does not point with its axis of rotation exactly to the line of symmetry of the rotationally symmetrical surface to be machined and therefore the axis of rotation of the milling cutter is not exactly perpendicular to the location to be machined. Instead the milling cutter is displaced in parallel relationship with respect thereto so that machining takes place in particular or exclusively in the outer region of the end face of the milling cutter. With the milling cutter having a progressive action therefore the entire machining location will be of a contour in the shape of an arcuate segment and in that respect —depending on the angular size of that arc —the cutting forces are applied in a tangential plane relative to the peripheral surface of the crank throw bearing journal, but here not preferably transversely to the line of symmetry of the crank throw bearing journal but directed inclinedly with respect thereto, more specifically with a considerable, more often than not determining component in the longitudinal direction of the crankshaft, that is to say in the direction of a generatrix of the crank throw bearing journal in question.

In that way it can be provided that the main direction of application of the machining forces is in the longitudinal direction of the crankshaft and, as the crankshaft is generally sturdier in that direction than in the transverse direction, relatively small amounts of deformation of the crankshaft due to the machining operation result therefrom.

furthermore it is highly advantageous in that respect to operate the milling procedure as so-called high-speed milling (HSC=High Speed Cutting). In that respect operation is effected at cutting speeds of about 500 m/min in the roughing operation and about 700 m/min in the finishing or smoothing operation, and the cutting edge of the milling cutter has a cutting geometry which is positive, in contrast to conventional milling. This means that the angle of that surface of the milling cutter which moves into the workpiece is at an angle of rather more than 90° relative to the workpiece surface, in contrast to an angle below 90° in the case of conventional milling. In that case the workpiece would rotate only at 4–30 revolutions per minute, preferably at 4–10 revolutions per minute.

A particularly advantageous configuration provides that only comparatively few cutting edges, in the ideal situation only a single cutting edge, is to be arranged on the end face of the milling cutter. For, in contrast to the theoretical expectations, it has been found that the facet-like surface configuration which is typical in regard to milling machining, in relation to rotationally symmetrical surfaces, is primarily caused not by the interrupted cut of the milling cutter but evidently by virtue of the fact that the individual cutting edges of a milling cutter are not all adjusted in their exact reference or target position. The lower the nurse of cutting edges of a milling cutter are intended to cut the same machining location, the higher the degree of accuracy with which those cutting edges can be set in their reference or target position, and the less pronounced therefore are the facets of the machined rotationally symmetrical surface. If the milling cutter has only a single cutting edge thereon, there cannot be any deviations whatsoever in respect of the actual positions of the individual cutting edges of the milling cutter so that the surface quality achieved is particularly good.

A further possibility involves effecting at least the partial machining step of the milling operation in the form of a ha shank-type milling procedure, that is to say after the workpiece has already been harden, at least in the region near the surface.

In this case also milling is effected at a cutting speed of about 450 m/min. while the speed of notation of the milling cutter is for example 6000 revolutions per minute with a workpiece in the form of a motor car crankshaft. In such a machining operation, with an oversize of 0.5 mm. deviations in respect of shape of the machined bearing location of only 0.2–0.3 µm occur, so that under some circumstances it may be possible completely to omit a subsequent machining operation by means of grinding. This result is preferably again possible by virtue of using a single cutting edge on the end and/or peripheral surface of the milling cutter, but in that case there is at least one second oppositely disposed cutting edge which however is rendered inoperative by being set back and which only serves to compensate for the unbalance which would occur by virtue of the single cutting edge which performs a cutting function in the respective milling cutter surface.

Figure 1B:
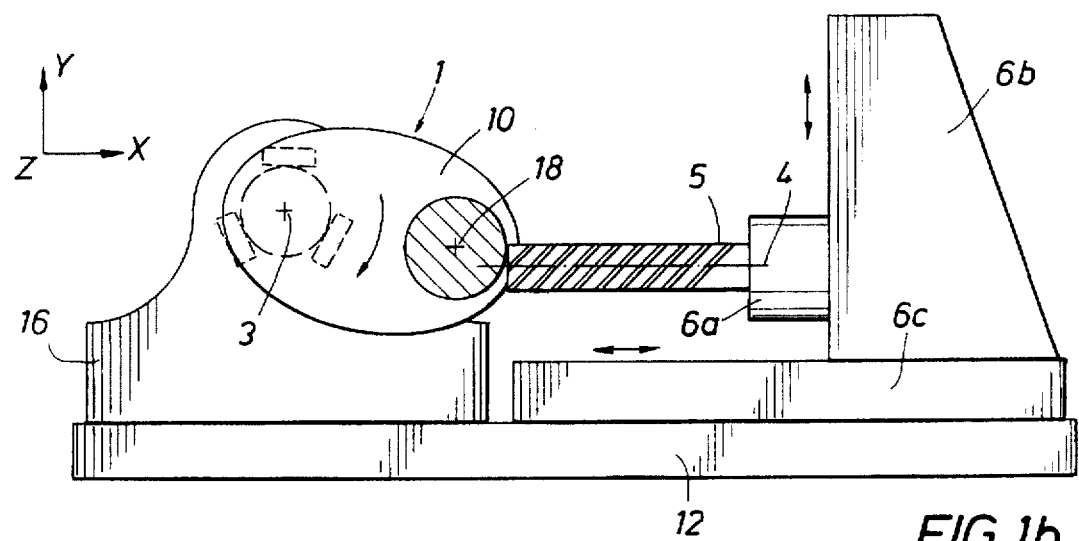
Figure 1C:
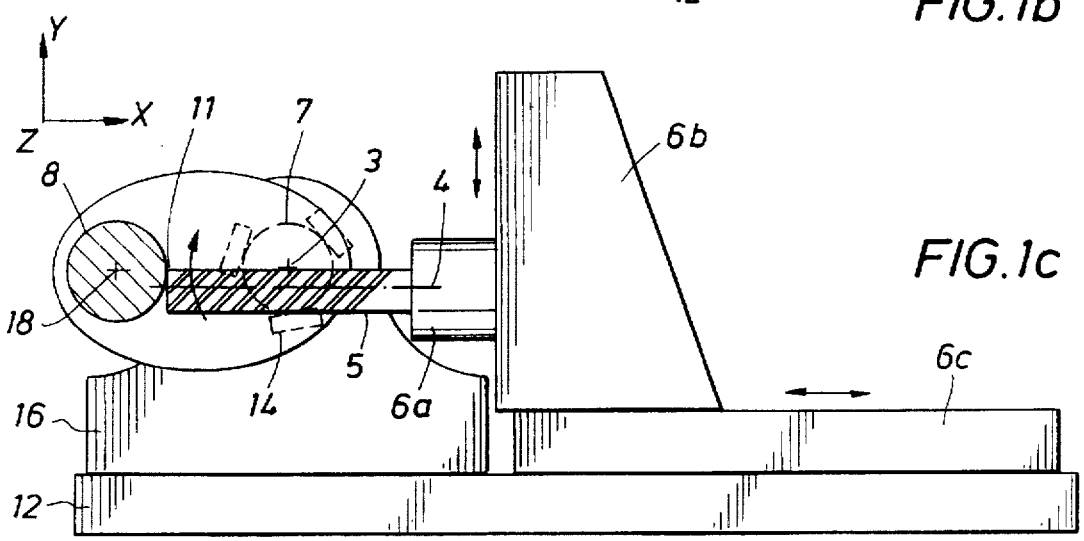

An embodiment in accordance with the invention is described in greater detail hereinafter by way of example. In the drawing:

FIGS. 1a–1c show machining by neons of rotational milling by linear X- and Y-movement.

Figure 2A:
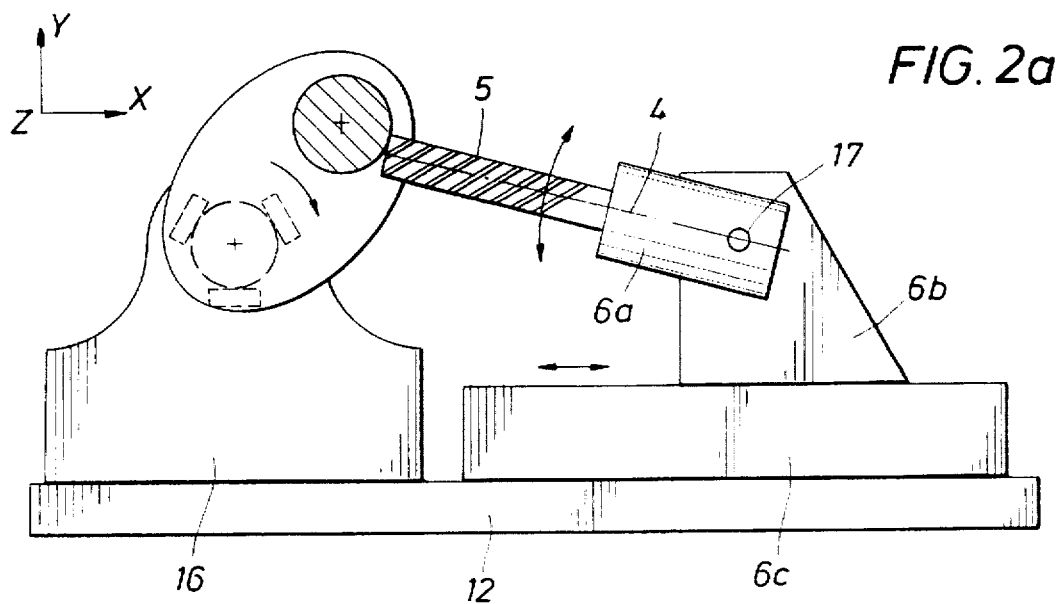
Figure 2B:
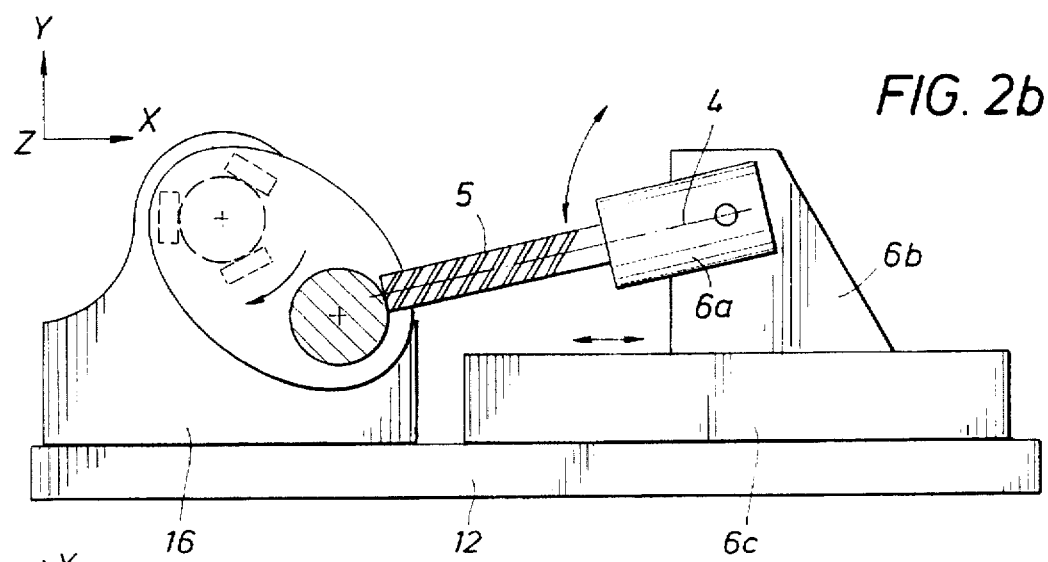
Figure 2C:
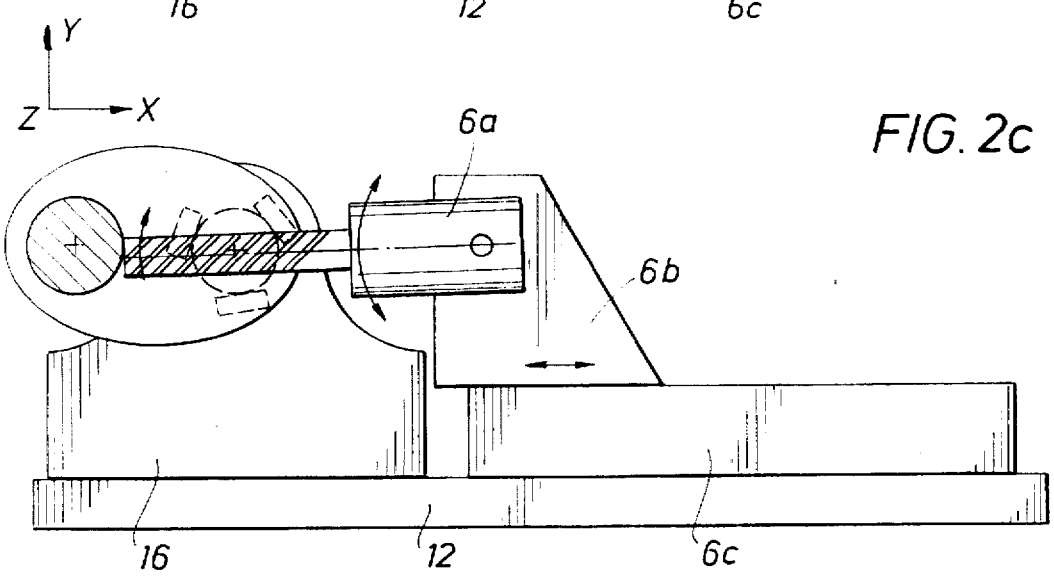
Figure 3:
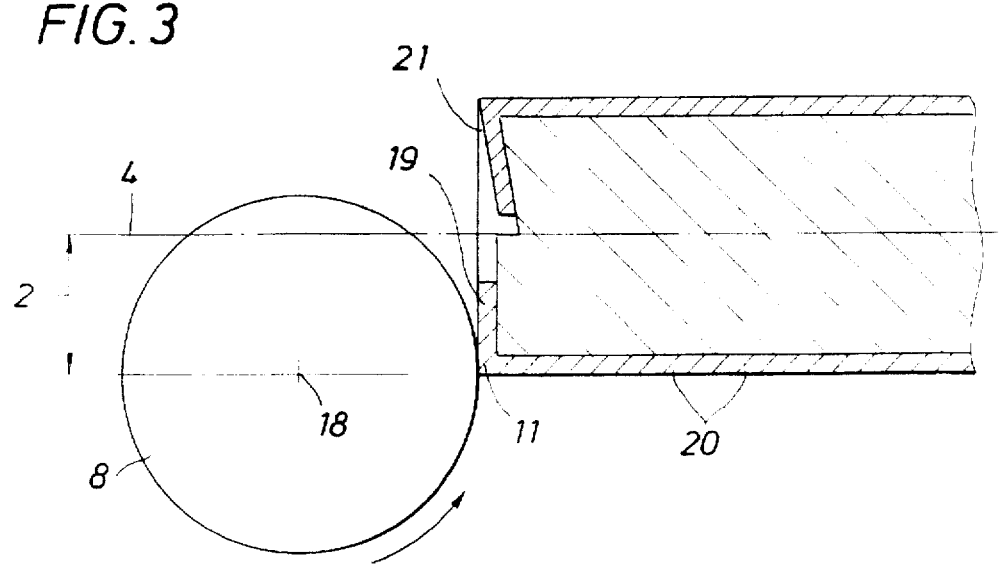
Figure 3A:
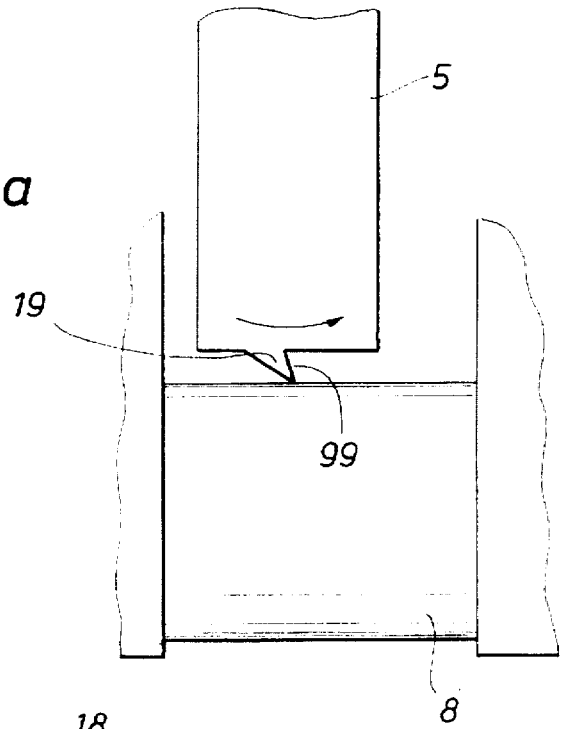
Figure 4:
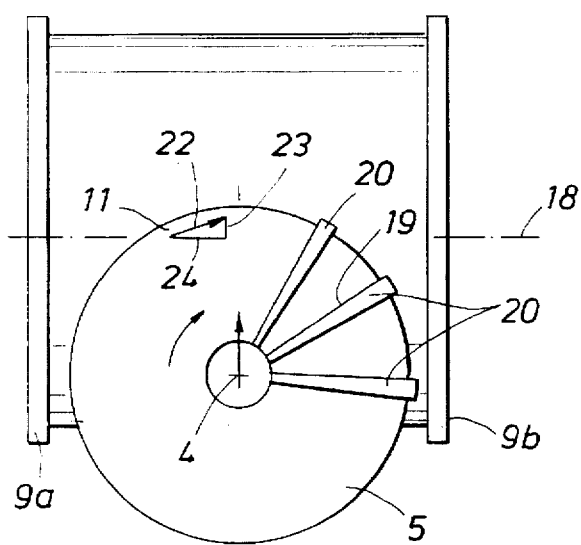

FIGS. 2a–2c show machining by means of X- and C2-movements of the milling cutter, FIG. 3 is a detail view on an enlarged scale from FIG. 1, FIG. 3a shows the action of the cutting edge of the milling cutter on the peripheral surface of the crank throw bearing journal, FIG. 4 is a view looking in the direction of the milling cutter axis, and FIG. 5 is a plan view of a machine according to the invention.

FIGS. 1a–1c viewing in the direction of a spindle axis 3, also known as a C-axis are showing the operation of machining a crank throw bearing pin or journal with the end face of a finger milling cutter 5 which is displaceable linearly both in the X- and also the Y-directions.

In the views shown in FIGS. 1a–1c the axis of rotation 4 of the milling cutter 5 is horizontal but it does not point precisely to the 15 middle 18 of the crank thaw journal but is displaced in parallel relationship with respect thereto so that the machining location U, that is to say the location of contact between the crank throw bearing journal 8 and the end face of the milling cutter 5, is in a region laterally beside the plane which passes through the middle 18 of the 20 crank throw bearing journal 8 and the axis of rotation 4 of the milling cutter. That affords a better application of forces, as is shown in detail in FIG. 4.

As illustrated by the individual phases of the movement involved in FIGS. 1a–1c, the entire periphery of the crank throw bearing journal 8 is machined by the end face of the milling cutter 5—and if necessary the adjoining crank throw side cheek portion surfaces 10 are machined by the cutting edges on the peripheral surface of the milling cutter 5—insofar as the crankshaft 1 is rotated slowly about the spindle axis 3 by means of the clamping device 14 which is generally a jaw-type chuck.

In dependence thereon the milling cutter 5 is respectively also moved in the X- and Y directions in such a way that the end face of the milling cutter 5 machines at the machining location 11 approximately in the horizontal plane which passes through the middle 18 of the crank throw bearing journal 8.

For that purpose the milling cutter 5 is rotatably drivably accommodated in a milling cutter support 6a which is vertically displaceable relative to the milling cutter support 6b, and wherein the milling cutter Support 6b is displaceable in the X-diretion relative to the machine bed 12.

The dimensioning of the length of the milling cutter 5 or of the displacement of the milling cutter supports 6a and 6b in the X- and directions direction must be such that, in the highest and lowest positions of the crank throw bearing journal 8 in the Y-direction, the end face of the milling cutter 5 can reach the machining location 11 just as in the position of the crank throw bearing journal 8, which is the closest position or the most remote position in the X-direction, relative to the milling cutter 5.

In comparison, FIG. 2a–2c are showing another structural configuration in which milling cutter 5 with the milling cutter support 6a for carrying and driving it is pivotable about a pivot axis 17 also known as a C2-axis which extends parallel to the, spindle axis 3 and which is arranged displaced relative thereto in the X-direction at approximately the same height, through a restricted range, relative to the milling cutter support 6b. In addition, in this case also the milling cutter support 6b is linearly displaceable in the X-direction relative to the machine bed 12.

That also permits machining of the entire periphery of the crank throw bearing journal B during one of the slowly performed revolutions of the crankshaft 1 about the spindle axis 3, that is to say the middle of the middle bearing journal 7.

As can be seen from the FIGS. in that case the milling cutter axis 4 is horizontal when the crank throw bearing journal 8 is in the position which is closest in the milling cutter support 6a, 6b, and in the position which is turned through 180° relative thereto and which is furthest away, if in that construction the pivot axis 17 is at or in a spacing 2 below the level of the spindle axis 3. This however is not absolutely necessary so that the pivot axis 17 may also certainly be higher or lower.

The magnitude of the maximum possible angle of pivotal movement of the milling cutter 5 about the pivot axis 17 depends on the spacing 5 between the pivot axis 17 end the end face of the milling cutter 5 and the throw of the crankshaft.

In the case of FIGS. 2a–2c also both the pivotal movement about the pivot axis 17 and also the linear movement in the X-direction by the milling cutter support 6 must be controlled and adjusted in dependence an the angular position of the C-axis, that is to say the movement of the crankshaft 1 about the spindle axis 3.

FIG. 3 shows a detail view from FIG. 1 on an enlarged scale, with the modification that in FIG. 3 the axis of rotation 4 of the milling cutter 5 is displaced upwardly instead of downwardly by the spacing 2 relative to the middle 18 of the crank throw bearing journal 8.

This arrangement would be adopted if the rotational movement of the crankshaft 1 were to be in the counter-clockwise direction as in that way the lowest pint of the end face of the milling cutter 5 with its respective cutting edges 19 is first to came into contact with the peripheral surface of the crank throw bearing journal 8.

When viewing in the direction of the milling cutter axis 4, as illustrated in FIG. 4 therefore, the machining location 11 would therefore be proximately of a configuration in the foam of an arcuate segment.

In order additionally to ensure that a cutting action occurs only at the outermost periphery of the end face of the milling cutter 5—apart from the cutting action by the peripheral cutting edges 20 which if required machine the adjoining crank side cheek portion surfaces—the end face of the milling cutter 5 may also be concavely recessed in a conical configuration towards the middle, in which respect an extremely small angle 21 as between the radial plane with respect to the axis of rotation of the milling cutter 4 and the direction of the end cutting edges 19 is already sufficient.

As can be seen in FIG. 4 viewing in the direction of the axis of rotation 4 of the milling cutter 5, the force applied to the crank throw bearing journal 8 by the end cutting edges 19, in regard to the direction thereof, will lie in a tangential plane of the crank throw 5 bearing journal 8 through the machining location 11, and in that resect will have both a component 23 in the Y-direction and also a component 34 in the Z-direction. The endeavour is to maximise the magnitude of the component 34 in the Z-direct relative to the component 23 in the Y-direction, that is to say to apply the largest possible proportion of the forces to be applied in the longitudinal direction of the crankshaft, instead of in the transverse direction thereof, as in that case less deformation phenomena are to be feared because of the higher degree of stability and sturdiness of the crankshaft in the longitudinal direction.

FIG. 5 is a plan view of a machine for finishing machining of crankshafts in a clamping arrangement.

In that situation the crankshaft 1 is carried at both ends in clamping devices 14a, 14b by its end journals which align with the central bearing journals, and is driven in rotation and with a 20 controlled C-axis by way of the clamping devices.

The clamping devices 14a, 14b are carried on spindles 13a, 13b which are aligned with each other and which are directed in mutually opposite relationship and which are each mounted in a respective headstock 16a, 16b. In that respect, preferably one of the headstocks (16b) is displaceable in the Z-direction in order to be able to accommodate workpieces of different lengths.

In that respect, for machining the central bearing locations 7 and the adjoining crank side cheek portion surfaces 9a and 9b, arranged beside the crankshaft 1 is a turning-rotational broaching unit 24 which is disposed on the machine bed 12 and which preferably includes a plurality of turning-rotational broaching tools 25 in side-by-side relationship, according to the number of central bearing journals 7, but it may also have only a single such tool 25.

The turning-rotational broaching unit 24 is mounted pivotably about an axis 26 which is arranged parallel to the spindle axis 3 and it is mounted at the ends in rotational broaching supports 27a, 27b which are displaceable synchronously at least in the X-direction but preferably also in the Z-direction. Simultaneously or also after machining of the crankshaft 1 by the tuning-rotational broaching unit 24 the rotational milling unit 28 which is arranged on the side of the spindle axis 3 which is opposite to the turning-rotational broaching unit can effect machining of the crank throw bearing journals 8 and possibly the adjoining crank throw side cheek portion surfaces 10, in which respect nowadays side cheek portion surfaces are generally no longer cuttingly machined at all.

In that situation the rotational milling unit 28 does not have to be disposed exactly opposite the turning-rotational broaching unit 24 or another unit for conventional machining of the central bearing journals 7, but the arrangement may also involve an angular position in respect of the two directions of action on the crankshaft.

In that respect the rotational milling unit 28 comprises a multi-part milling cutter support, wherein the milling cutter suit 6c is displaceable along the machine bed 12 in the Z-direction a milling cutter support 6b can be displaced on the support 6c in the X-direction, that is to say radially towards or away from the crankshaft.

In turn a milling cutter support 6a is linearly displaceable in the Y-direction on the milling cutter support 6b. The milling cutter is rotationally are drivably carried in the milling cutter support 6a, facing substantially radially towards the crankshaft.

It will be appreciated that the directions of movement of the individual supports do not have to be exactly in the X-, Y- etc directions, but this facilitates the design of the control system.

FIG. 3a shows in the direction of view IIIa—IIIa shown in FIG. 3 the action of the end cutting edge 19 of the milling cutter 5 on the peripheral surface of the crank throw bearing journal 8.

It will be seen in this respect that the angle 99 between the workpiece surface to be machined nd the end face of the cutting edge is greater than 90°, that is to say there is a so called positive cutting edge geometry. In that respect the angle 99 ranges between preferably 90° and 100°.

We claim:

1. A method of machining a workpiece (1) with convexly curved, substantially rotationally symmetrical workpiece surfaces which are both concentric workpiece surfaces (7) and also eccentric workpiece surfaces (8) with respect to a longitudinal axis through said workpiece (1), wherein
    said workpiece (1) is clamped rotatably drivably alone a spindle axis (3), also known as a C-axis, which is concentric with said longitudinal axis through said workpiece (1), and
    rotational milling of the eccentric workpiece surfaces (8) is effected by means of end-milling wherein an axis of rotation (4) of a milling cutter (5) is transverse with respect to the spindle axis (3),
characterised in that:
    a) the concentric workpiece surfaces (7) are machined by means of rotational broaching or turning-rotational broaching.
    b) the workpiece is subjected to cutting finishing machining in a clamping means.

2. A method according to claim 1 characterised in that in machining of the eccentric, substantially rotational symmetrical workpiece surfaces (8), the spacing (2) from the axis of rotation (4) of the milling cutter (5) to an instantaneous machining location (11) is maximized to provide for increased milling cutter blade speed at a given number of revolutions per unit time and decreased imposition of force transverse to the workpiece for a given rate of cutting.

3. A method according to claim 2 characterised in that the axis of rotation (4) of the milling cutter is tangentially displaced relative to the instantaneous machining location (11) on the workpiece in the direction of rotation of the workpiece.

4. A method according to claim 3 characterised in that the axis of rotation (4) of the milling cutter (5) is at a right angle to the spindle axis (3).

5. A method according to claim 4 characterised in that side cheek portion surfaces (10) which adjoin the eccentric workpiece surfaces (8) and which extend radially with respect to the spindle axis (3) are machined by means of rotational milling.

6. A method according to claim 4 characterised in that machining of the workpiece surfaces (7, 8) is effected simultaneously with machining of adjoining radial cheek portion surfaces (9a, 9b, and 10).

7. A method according to claim 3 characterised in that side cheek portion surfaces (10) which adjoin the eccentric workpiece surfaces (8) and which extend radially with respect to the spindle axis (3) are machined by means of rotational milling.

8. A method according to claim 3 characterised in that machining of the workpiece surfaces (7, 8) is effected simultaneously with machining of adjoining radial cheek portion surfaces (9a, 9b, and 10).

9. A method according to claim 2 characterised in that the axis of rotation (4) of the milling cutter (5) is at a right angle to the spindle axis (3).

10. A method according to claim 9 characterised in that side cheek portion surfaces (10) which adjoin the eccentric workpiece surfaces (8) and which extend radially with respect to the spindle axis (3) are machined by means of rotational milling.

11. A method according to claim 9 characterised in that machining of the workpiece surfaces (7, 8) is effected simultaneously with machining of adjoining radial cheek portion surfaces (9a, 9b, and 10).

12. A method according to claim 2 characterised in that side cheek portion surfaces (10) which adjoin the eccentric workpiece surfaces (8) and which extend radially with respect to the spindle axis (3) are machined by means of rotational milling.

13. A method according to claim 2 characterised in that machining of the workpiece surfaces (7, 8) is effected simultaneously with machining of adjoining radial cheek portion surfaces (9a, 9b, and 10).

14. A method according claim 1 characterised in that the axis of rotation (4) of the milling cutter is tangentially displaced relative to the instantaneous machining location (11) on the workpiece in the direction of rotation of the workpiece.

15. A method according to claim 14 characterised in that the axis of rotation (4) of the milling cutter (5) is at a right angle to the spindle axis (3).

16. A method according to claim 15 characterised in that side cheek portion surfaces (10) which adjoin the eccentric workpiece surfaces (8) and which extend radially with respect to the spindle axis (3) are machined by means of rotational milling.

17. A method according to claim 15 characterised in that machining of the workpiece surfaces (7, 8) is effected simultaneously with machining of adjoining radial cheek portion surfaces (9a, 9b, and 10).

18. A method according to claim 14 characterised in that side cheek portion surfaces (10) which adjoin the eccentric workpiece surfaces (8) and which extend radially with respect to the spindle axis (3) are machined by means of rotational milling.

19. A method according to claim 14 characterised in that machining of the workpiece surfaces (7, 8) is effected simultaneously with machining of adjoining radial cheek portion surfaces (9a, 9b, and 10).

20. A method according to claim 1 characterised in that the axis of rotation (4) of the milling cutter (5) is at a right angle to the spindle axis (3).

21. A method according to claim 20 characterised in that side cheek portion surfaces (10) which adjoin the eccentric workpiece surfaces (8) and which extend radially with respect to the spindle axis (3) are machined by means of rotational milling.

22. A method according to claim 20 characterised in that machining of the workpiece surfaces (7, 8) is effected simultaneously with machining of adjoining radial cheek portion surfaces (9a, 9b, and 10).

23. A method according to claim 1 characterised in that side cheek portion surfaces (9a and 9b) which adjoin the concentric workpiece surfaces (7) and which extend radially to the spindle axis (3) are machined by means of rotational broaching or turning-rotational broaching.

24. A method according to claim 1 characterised in that side cheek portion surfaces (10) which adjoin the eccentric workpiece surfaces (8) and which extend radially with respect to the spindle axis (3) are machined by means of rotational milling.

25. A method according to claim 1 characterised in that machining of the workpiece surfaces (7, 8) is effected simultaneously with machining of adjoining radial cheek portion surfaces (9a, 9b, and 10).

26. A machine for machining a workpiece (1) with convexly curved, rotationally symmetrical workpiece surfaces which are both concentric workpiece surfaces (7) and also eccentric workpiece surfaces (8) with respect to a longitudinal axis through said workpiece (1), comprising:

a machine bed (12), at least one rotatably drivable workpiece spindle (13), at least one clamping device (14) for the workpiece (1), a C-axis drive, and at least one milling unit, wherein the milling unit is a rotational milling unit, in that a milling cutter (5) is rotatably drivably carried in a milling cutter support (6) which can perform movements which can have both components in the X-direction and also in the Y-direction, and the machine has a control which permits positioning and displacement of the milling cutter support (6) and therewith the milling cutter (5) in dependence on the positioning and the displacement of the C-axis, characterised in that:

milling cutter support (6) is linearly displaceable in a transverse direction relative to the longitudinal axis of the workpiece and the milling cutter (5) is pivotable relative to the milling cutter support (6) about a C2-axis (17) which is parallel to the longitudinal direction of the workpiece (1), and the maximun pivotability of the milling cutter about the C2-axis (17) and also the length of the milling cutter (5) are so dimensioned that the milling cutter (5) can with its end face reach the workpiece surface to be machined, in any of the possible rotational position thereof.

27. A machine according to claim 26 characterised in that the end face of the milling cutter (5), which has at least one cutting edge (19) is concavely recessed towards the middle of said end face.

28. A machine according to claim 27 characterised in that the angle (21) of the recess in the end face of the milling cutter (5) is an extremely small angle.

29. A method according to claims 1, 2, 3, or 13 characterised in that for machining of the workpiece surfaces by means of rotational milling the milling cutter (5) is linearly displaceable in dependence on the rotational position of the workpiece (1) in at least one transverse direction relative to the longitudinal axis of the workpiece (1) and is limitedly pivotable about a C2-axis (17) which is parallel to the longitudinal axis of the workpiece (1), wherein the length of the milling cutter (5) and the pivotability are of such a dimension that the milling cutter (5) with its end face can reach the workpiece surface (8) to be machined in any of the rotational positions of the latter.

* * * * *